(12) United States Patent
Ho

(10) Patent No.: US 10,508,834 B1
(45) Date of Patent: Dec. 17, 2019

(54) FALLING PARTICLE SOLAR RECEIVERS

(71) Applicant: National Technology & Engineering Solutions of Sandia, LLC, Albuquerque, NM (US)

(72) Inventor: Clifford K. Ho, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 478 days.

(21) Appl. No.: 15/095,738

(22) Filed: Apr. 11, 2016

Related U.S. Application Data

(60) Provisional application No. 62/145,136, filed on Apr. 9, 2015.

(51) Int. Cl.
*F24S 80/20* (2018.01)

(52) U.S. Cl.
CPC ..................... *F24S 80/20* (2018.05)

(58) Field of Classification Search
CPC .. F24S 80/20; F24S 21/00; F24S 90/00; F24S 10/90; F24S 10/95
See application file for complete search history.

(56) References Cited

U.S. PATENT DOCUMENTS

| 4,727,930 A * | 3/1988 | Bruckner ............... F02C 1/05 165/111 |
| 8,109,265 B1 | 2/2012 | Kolb |
| 2013/0068217 A1 | 3/2013 | Al-Ansary et al. |

* cited by examiner

*Primary Examiner* — Alfred Basichas
(74) *Attorney, Agent, or Firm* — Daniel J. Jenkins

(57) ABSTRACT

Falling particle solar receivers, systems, and methods are disclosed that include one non-linear falling particle curtain or two or more falling particle curtains within a solar receiver that receives incident solar radiation. The particles heated in the solar receiver may be used to heat a secondary fluid. In an embodiment, the particles may be recirculated to improve energy capture and thermal efficiency. In other embodiments, an air curtain may be used across the aperture of the receiver, and flow-control devices may be used to evenly spread particles across the width of the receiver inlet. Finally, feed particles may be preheated using heat from the solar receiver.

17 Claims, 6 Drawing Sheets

FALLING PARTICLE SOLAR RECEIVERS

CROSS-REFERENCE TO RELATED APPLICATIONS

This application claims priority to U.S. Provisional Patent Application Ser. No. 62/145,136, "Falling Particle Solar Receivers," filed on Apr. 9, 2015, the disclosure of which is incorporated by reference herein in its entirety.

STATEMENT OF GOVERNMENT INTEREST

The United States Government has rights in this invention pursuant to Contract No. DE-AC04-94AL85000 between the United States Department of Energy and Sandia Corporation, for the operation of the Sandia National Laboratories.

FIELD

The present disclosure is generally directed to solar energy, and more particularly directed to falling particle solar receivers that include one or more planes or curtains of particle flow incident to solar impingement.

BACKGROUND

Solar power systems offer much promise for clean energy, with few, or zero, carbon emissions. These systems collect incident sunlight and convert this sunlight into a usable form of power, such as heat or electricity. Solar energy offers a clean, inexhaustible, sustainable solution to energy demands and has the potential to supply a very significant fraction of U.S. and global electricity consumption. While the U.S. and global solar power potential is known to be immense, solar power systems have not been economically competitive without government support, to date. Challenges remain to devise solar technologies that can lower installation costs, increase power output, and lower the marginal cost per unit energy produced, for a lower levelized cost of energy.

Emerging solar power systems include particle solar receivers that heat particles for energy conversion, energy storage, thermochemical processes, electricity production, and process heating. However, previously disclosed processes and systems are either not efficient in capturing solar energy to heat particles or require complex structures or fluidization, which increase costs and parasitic electricity consumption.

The need remains, therefore, for falling particle solar receivers and methods of falling particle heating that efficiently capture solar energy to heat particles for energy conversion, storage, and thermal processes.

BRIEF DESCRIPTION OF THE DRAWINGS

Wherever possible, the same reference numbers will be used throughout the drawings to represent the same parts.

SUMMARY OF THE DISCLOSURE

Figure 1:
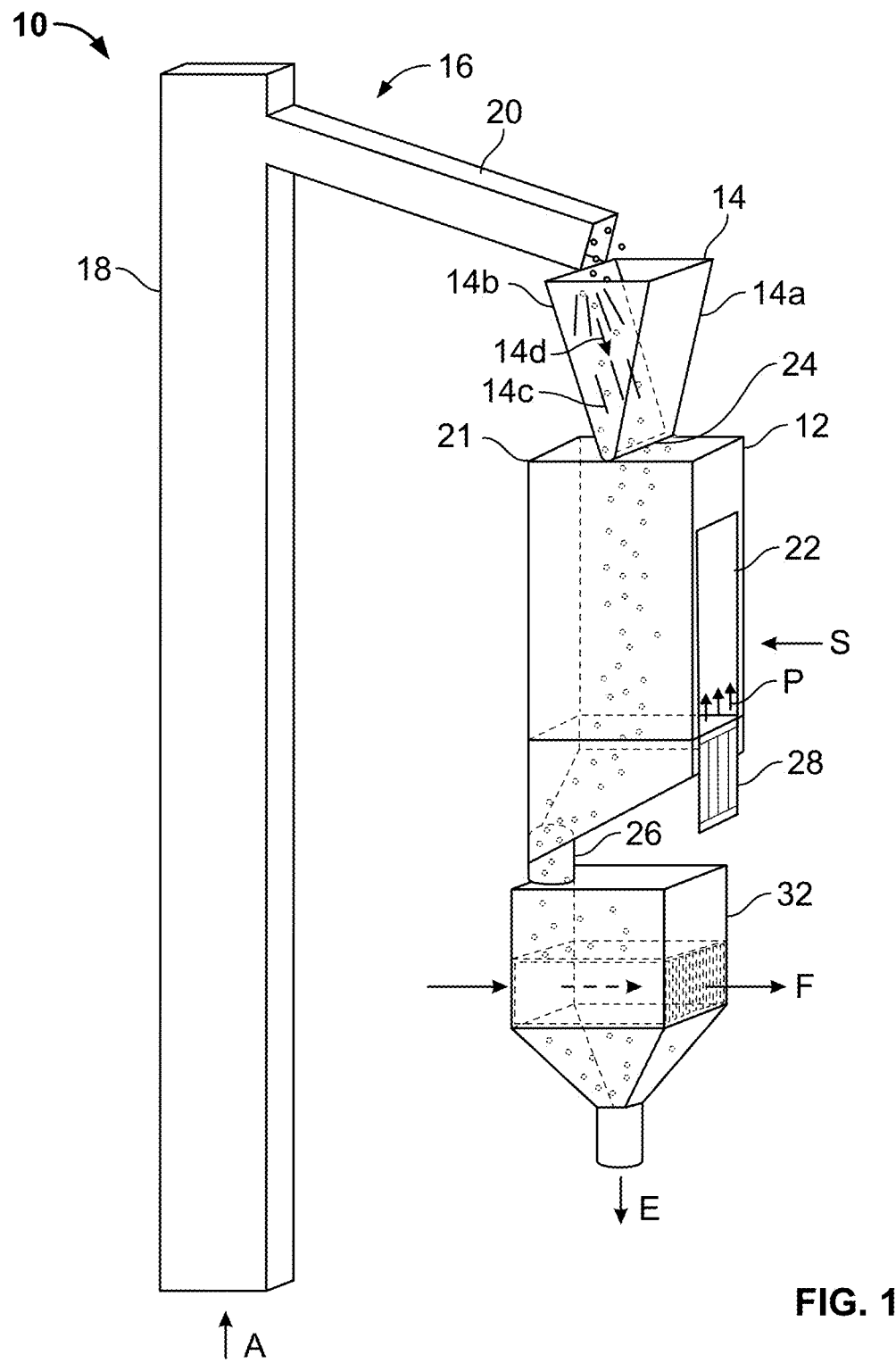
FIG. 1 illustrates a receiver system according to an embodiment of the disclosure.

In an embodiment of the disclosure, a falling particle solar receiver system is disclosed that includes a receiver body comprising an inlet for forming a curtain of falling particles through the falling particle solar receiver. The inlet has a width and a cross-section corresponding to a non-linear waveform shape.

According to another embodiment of the disclosure, a falling particle solar receiver is disclosed that includes a receiver body comprising two or more inlets for forming two or more parallel corresponding curtains of falling particles through the falling particle solar receiver.

According to another embodiment of the disclosure, a method for capturing energy from concentrated solar energy is disclosed that includes feeding particles to a solar receiver having an inlet for forming a falling particle curtain having a non-linear waveform cross-section and heating the curtain of falling particles with the concentrated solar energy.

According to another embodiment of the disclosure, a method for capturing energy from concentrated solar energy is disclosed that includes feeding particles to a solar receiver having two or more inlets for forming two or more corresponding parallel falling particle curtains.

In an embodiment of the disclosure, a solar receiver and method is disclosed that includes a falling particle receiver that includes two or more curtains or planes of particle flow receiving solar irradiance. In an embodiment, the solar radiance is received nearly perpendicular or nearly normal to the flow plane or curtain. In an embodiment, one or more of the planes of particle flow may be non-linear. In an embodiment, one or more of the planes of particle flow may be recirculated.

In an embodiment of the disclosure, a falling particle solar receiver and method is disclosed that includes a falling particle receiver that includes one or more planes of non-linear particle flow. In an embodiment, the solar receiver may include two or more planes of particle flow incident to solar irradiance. In an embodiment, one or more of the planes of particle flow may be recirculated. The non-linear particle flow may be wedges, sinusoidal, or other shapes that form high and low portions of particles.

An advantage of the present disclosure is that multiple planes of particle flow will capture more of the incident solar radiation than a single plane of particle flow. If one plane is behind the other relative to the receiver aperture and incident radiation, the plane of particles closest to the aperture can serve to insulate the second plane from convective and radiative heat losses through the receiver aperture.

Another advantage of the present disclosure is that multiple planes of particle flow allow particle flows at higher temperatures to transfer heat to cooler particle flows to pre-heat the cooler flows.

Another advantage of the present disclosure is that non-linear "curtains" of particle flow, which can be induced through non-linear slots of varying aperture sizes, can be used to control the transmittance of light. One can control the thickness and transmittance of the particle curtain by increasing the effective length of the particle curtain (adding more zig-zags or more amplitude to the zig-zags) while maintaining the same optical aperture size (width) and particle mass flow rate. The zig-zag pattern can also increase the amount of light-trapping relative to a linear curtain. Although the particle curtain does not act as a smooth specular surface, reflections from the particles in the zig-zag pattern can be intercepted by other particles more readily than in the linear pattern due to a cavity effect.

Other features and advantages of the present disclosure will be apparent from the following more detailed description of the preferred embodiment, taken in conjunction with the accompanying drawings which illustrate, by way of example, the principles of the disclosure.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art.

The present disclosure is directed to a falling particle solar receivers and methods that include a falling particle receiver having non-linear falling particle curtains incident to solar irradiance. In an embodiment, the falling particle receiver may have two or more falling particle curtains. In an embodiment, one or more of the particle flows may be recirculated. The non-linear particle flow may be wedges, sinusoidal, or other shapes that form high and low portions of particles.

The present disclosure is further directed to a falling particle solar energy systems including concentrating solar energy devices and methods that include high-temperature falling particle solar receivers for use in concentrating solar power applications. In an embodiment, particles fall through a highly concentrated beam of sunlight, which can be focused up to ~1000-3000 suns by an array of mirrors, and can be used to generate high-temperature steam (~650 C) or supercritical $CO_2$ (650-750 C) to generate electricity in highly efficient power cycles. In order to reach these high temperatures, the residence time of the particles in the concentrated beam can be increased by recirculating the particles within the cavity receiver. In an embodiment, a back-to-front or front-to-back recirculation scheme is used. In another embodiment, preheating the particles as they are lifted to the top of the receiver by an elevator or hoist is disclosed.

FIG. 1 illustrates a falling particle receiver system (receiver system) 10 according to an embodiment of the disclosure. As can be seen in FIG. 1, the receiver system 10 includes a falling particle receiver (receiver) 12, a feed hopper (hopper) 14, and a feed system 16. The feed system 16 includes a particle conveyor 18 and a feed tube 20. The feed tube 20 feeds particles from the particle conveyor 18 to the hopper 14. The particle conveyor 18 receives particles from a particle source A. In this exemplary embodiment, the particle conveyor 18 is a particle elevator, however, in other embodiments, other feed conveyor systems, such as, but not limited to screw conveyors, bucket elevators, pocket elevators, mine hoists, skip hoists, or paddle lifts, may be used. For example, the particle elevator may be an Olds Elevator, in which a casing rotates about a stationary screw.

The hopper 14 includes a front surface 14a nearer the direction of solar irradiance S and a rear surface 14b farther from the direction of solar irradiance S. In this exemplary embodiment, the particles are disposed from the feed tube 20 to contact the rear surface 14b. Raised ridges 14c disposed on the rear surface 14b direct the flow of particles to the bottom of the hopper 18 so that the particles are uniformly distributed along the width of the inlet 24 into the receiver 12. The raised ridges 14c may be, but are not limited to splines, biscuits, plates, pucks, slots or other flow control devices. In another embodiment, the feed tube 20 may be configured to first provide particles to the front surface 14a. In another embodiment, the front surface 14a may have ridges 14c or other features disposed thereupon to control and direct the flow of particles uniformly along the entire width of the bottom of the hopper 14. In another embodiment, the feed tube 20 may provide particles evenly to the front and rear surfaces 14a, 14b.

The receiver 12 includes a receiver body 21 having a window 22 for receiving concentrated solar energy. In this exemplary embodiment, the window 22 is an open space. In other embodiments, the window 22 may be a high temperature material transparent to solar radiation, such as, but not limited to high temperature quartz. The receiver 12 also includes a particle inlet (inlet) 24 and a particle outlet (outlet) 26. The inlet 24 is an opening into the receiver 12 for distributing particles that fall through the receiver 12 forming a falling particle curtain. The outlet 26 allows particle flow E to flow out of the receiver 12. The discharge particle flow E may be recirculated back to the particle source A to be fed back into the receiver system 10.

In this exemplary embodiment, the receiver system 10 also includes an air flow device 28. The air flow device 28 directs a flow or curtain of air across the window 22. The curtain of air across the window 22 reduces heat losses from the receiver and prevents external wind from disrupting the particles. In this exemplary embodiment, the air flow device 28 is shown directing the curtain of air vertically upward across the window 22. In other embodiments, the air flow device 28 may direct the curtain of air in any direction across the window 22. The air directed by the air flow device 28 may be ambient or heated, and the air may be recirculated. Piping and hardware, such as fans, for the air flow device 28, are not shown for simplicity, as these components are well known in the art.

In this exemplary embodiment, the receiver system 10 also includes a heat exchanger 32. The heat exchanger 32 receives heated particles from the outlet 26, and transfers heat to a fluid stream F. The fluid stream F may be water or $CO_2$ that may be heated by the heat exchanger to generate high-temperature steam or supercritical $CO_2$. In an embodiment, the $CO_2$ may be supercritical $CO_2$. In an embodiment, the high-temperature steam may be at a temperature greater than or equal to 650° C. In another embodiment, the $CO_2$ may be at a temperature between 650° C. and 750° C.). The design of the heat exchanger may utilize fluidized-bed or moving-packed-bed technologies to exchange between the particles and the tubes or plates containing the working fluid F to be heated.

Figure 2:
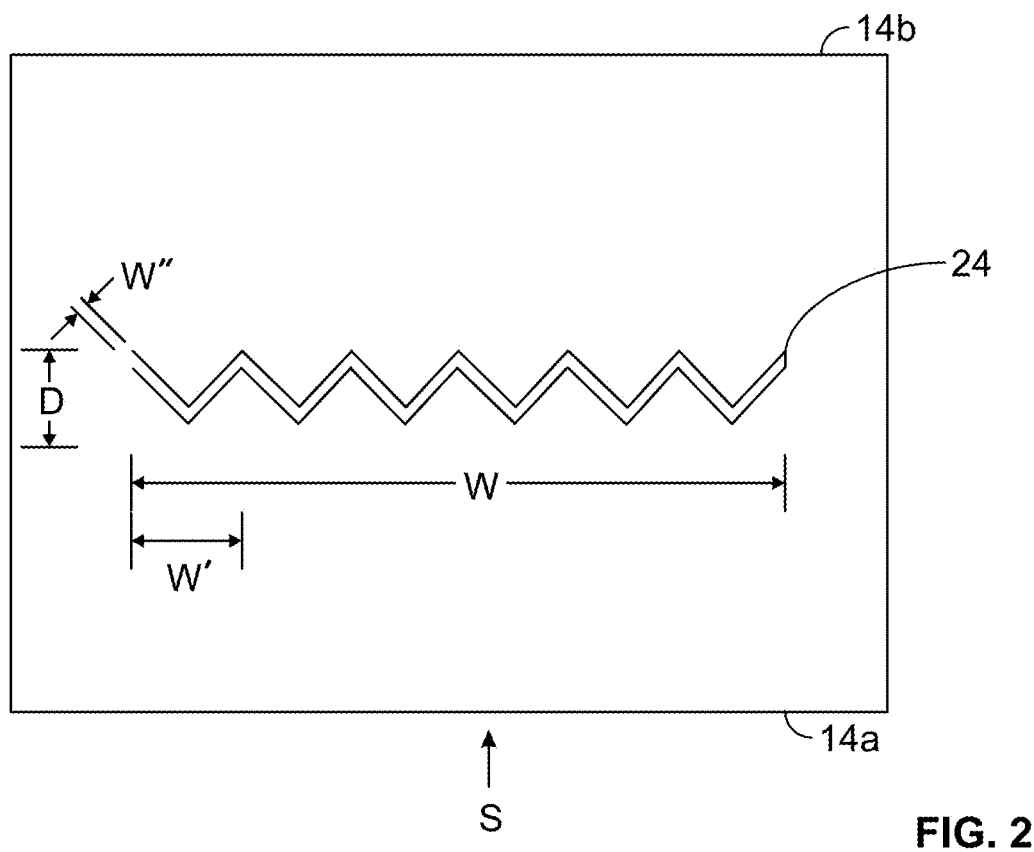
FIG. 2 illustrates a cross-section of an inlet according to an embodiment of the disclosure.

FIG. 2 is a top view of the inlet 24 that shows the cross-section of the inlet 24, which corresponds to the cross-section of a particle curtain of this exemplary embodiment. The inlet 24 is shown relative to the front and rear surfaces 14a, 14b of the hopper 14, and the direction incident to solar impingement (arrow S). In this exemplary embodiment, the cross-section is a triangle waveform, which may be referred to as a zig-zag waveform. The zig-zag cross section increases light trapping and may also serve to increase light transmittance by increasing the effective length of the release slot for a given mass flow rate of particles, thereby reducing the slot aperture along the length of the zig-zag cross-section.

The cross-section has a width W and a depth D. The depth D corresponds to the amplitude of the waveform. The waveform also has a wavelength W' that corresponds to one cycle of the waveform. The inlet 24 has an inlet width W''' that corresponds to the linear width of the falling particle curtain. In an embodiment, the inlet width W''' may be between 1 m and 30 m. In another embodiment, the inlet width W' may be between 2 m and 10 m. In an embodiment, the amplitude D of the waveform may be between 5 cm and 1 m. In another embodiment, the amplitude D may be between 10 cm and 50 cm. In an embodiment, the wavelength W' of the waveform may be between 5 cm and 5 m. In another embodiment, the wavelength W' may be between 10 cm and 1 m. The entire linear width W of the inlet 24 can range from 1 m to 30 m depending on size of the receiver and power plant. In other embodiments, the inlet 24 may have another waveform cross-section to create the corresponding cross-section of a particle curtain.

Figure 2A:
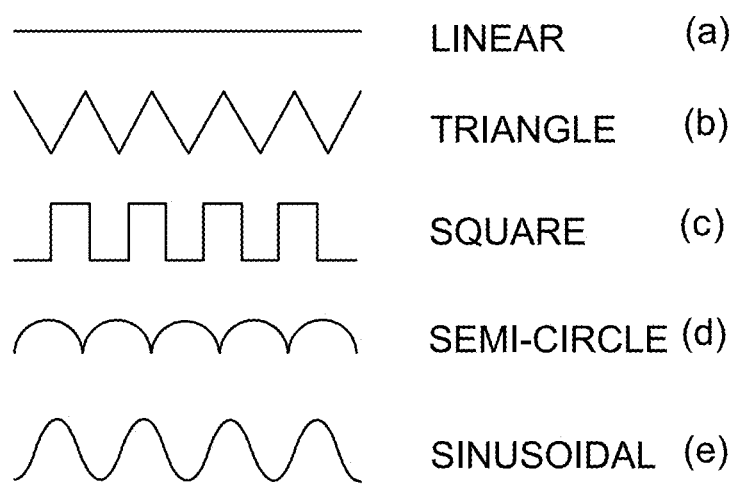
FIG. 2A shows various waveform shapes according to an embodiment of the disclosure.

FIG. 2A shows examples of linear (a) and non-linear waveforms that include triangle (b), square (c), semi-circle, and sinusoidal waveforms according to embodiments of the present invention. In other embodiments, the non-linear waveform may be, but is not limited to square, triangle, sinusoidal, alternating semicircles, continuous semi-circles or other sequences of shapes. These non-linear waveforms are in contrast to a rectangular cross-section (linear a), which may be referred to and as defined herein as a "linear waveform" i.e. having an infinite wavelength.

It should be appreciated that the cross-section of the falling particles is not strictly defined by the cross-section of the inlet 24, but that the cross-section of the fluid curtain may vary as the particles interact and are heated as they fall through the receiver 12 as the particles interact and are heated. However, the cross-section of the fluid curtain still generally maintains the cross-section of the inlet. The use of non-linear waveforms or multiple parallel linear and/or non-linear waveforms allows for reflections and thermal emittance from the particles and walls to be intercepted by other particles more readily than in a linear pattern, for example if the cross-section is a rectangle, discussed below), due to a cavity effect.

Figure 3:
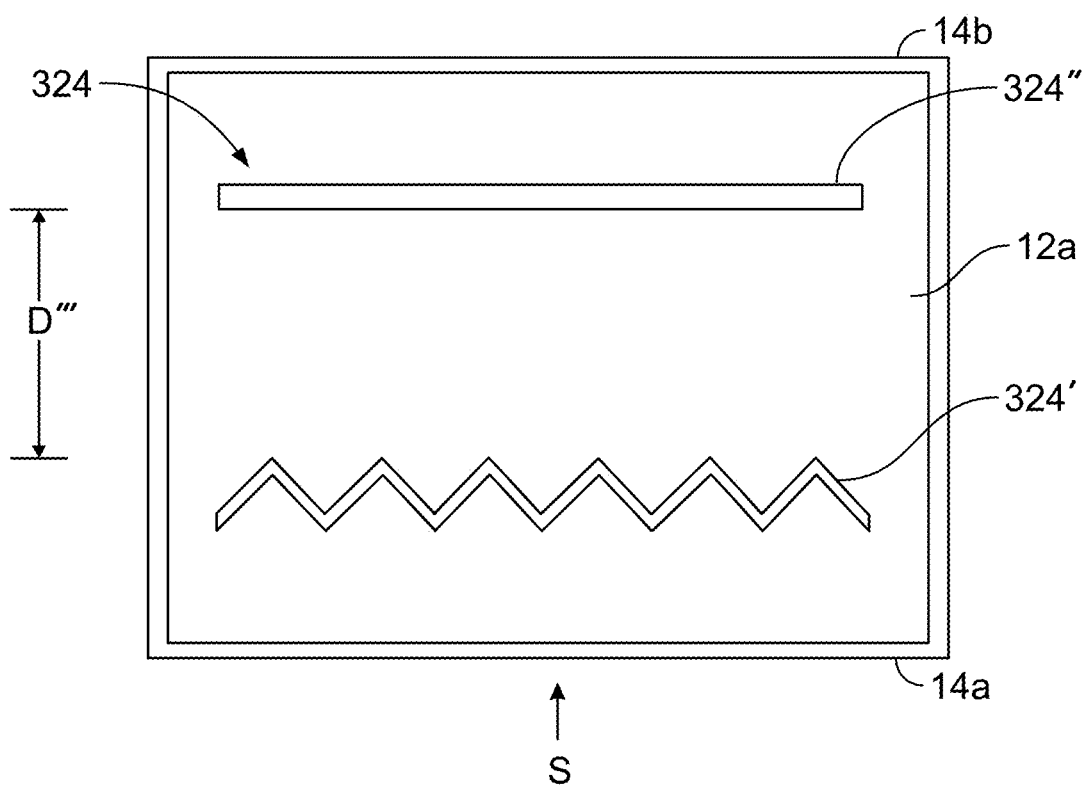
FIG. 3 illustrates cross-sections of inlets according to an embodiment of the disclosure.

FIG. 3 is a top view of another inlet 324 that shows the cross-section of the inlet 324 of this exemplary embodiment. As can be seen in FIG. 3, the inlet 324 includes a front inlet 324' and a rear inlet 324". The cross-sections of the front and rear inlets 324', 324" correspond to their respective falling particle curtain cross-sections. As can be seen in FIG. 3, the rear inlet 324" is a rectangular slot that forms a rectangular cross-section rear falling particle curtain. The front inlet 424' has a triangle waveform cross-section that forms a triangle or zig-zag waveform cross-section front falling particle curtain. In other embodiments, the front and rear inlets 324',324" may have any combination of the disclosed geometries and combinations of geometries as described herein. In other embodiments, the inlet 324 may have two or more inlets to form two or more curtains of any combination of inlet cross-sections.

In an embodiment, the inlet 324 may have two or more inlets having rectangular cross-sections. In another embodiment, multiple parallel inlets of varying shapes may be used.

The front and rear inlets 324',324" are separated by a curtain separation distance D'''. In an embodiment, the curtain separation distance D''' may be 10 cm to 5 m. In another embodiment, the curtain separation distance may be 10 cm to 1 m. The front and rear inlets 324',324" form parallel curtains of falling particles. The term "parallel" is intended to encompass the parallel flow of particles through the major plane of the curtain formed through the wavelength of the particle flow. For example, for the curtains formed from the front and rear inlets 324, 324", the rear curtain's major plane is simply though the center of the rectangular cross-section. The front curtain's major plane is though and bisecting the amplitude of the waveform.

The front and rear inlets 324, 324' are through a top surface 12a of the receiver 12. In this exemplary embodiment, the top surface 12a is perpendicular (i.e., horizontal) to the direction of particle flow through the receiver 12. In another embodiment, the top surface 12a may be slanted (non-horizontal) to direct the particles from either the front 14a to the back 14b or from the back to the front of the top surface 12a. In such a manner, the slanted surface 12a accommodates different particle mass flow rates, which can be controlled by the particle elevator 18. At low particle mass flow rates, the particles will fall through the first inlet encountered. At higher mass flow rates, the flow rate of the first inlet will be exceeded and particles will flow to the next inlet. The particles will continue to flow through successive inlets until the mass flow rate of the particles discharged through the elevator matches the discharge capacity of the multiple inlets. The surface 12a will be designed to have as many inlets as required to match the maximum mass flow rate of the elevator or required by the system. In another embodiment, the aperture size of the slots may vary. For example, the initial aperture of the slot that the particles encounter may be small to only handle small mass flow rates. The subsequent slot apertures may be successively larger to handle increasing mass flow rates. These multi-inlet structures that accommodate variable particle mass flow rates may be, but are not limited to, grates, plates, and troughs with multiple slots (inlets). In another embodiment, the width of the slots may vary. The width of slots further away from the aperture (where the incident radiation enters) can be larger than the width of the slots closer to the aperture to accommodate the divergence of the beam, which is focused at the aperture.

In an embodiment, the feed tube 20 may provide particles to the front surface 14a, thus first feeding particles to the front inlet 324'. In such a manner, only when the mass flow of particles exceeds the discharge capacity of the front inlet 324' will particles be provided to the rear inlet 324" to form a second falling particle curtain. Similarly, particles could be provided to the rear surface 14b, so that only when the mass flow of particles exceeds the discharge capacity of the rear inlet 324' will particles be provided to the front inlet 324' forming a second falling particle curtain. In these embodiments, controlling the mass flow rate of particles discharged from the feed tube 20 can be used to control the number of formed falling particles curtains. In an embodiment, the mass flow of particles may be controlled by controlling the speed thus the mass flow provided by the conveyor 18. In another embodiment, more than two inlets of varying waveforms may be used to accommodate the maximum mass flow of the elevator or system. In addition, the receiver system may include multi-inlet structures that can accommodate variable particle mass flow rates and their direction or feed to one or more inlets. The multi-inlet structures may be, but are not limited to, grates, plates, and troughs with multiple slots (inlets) located in the inlet and or hopper structures.

Figure 4:
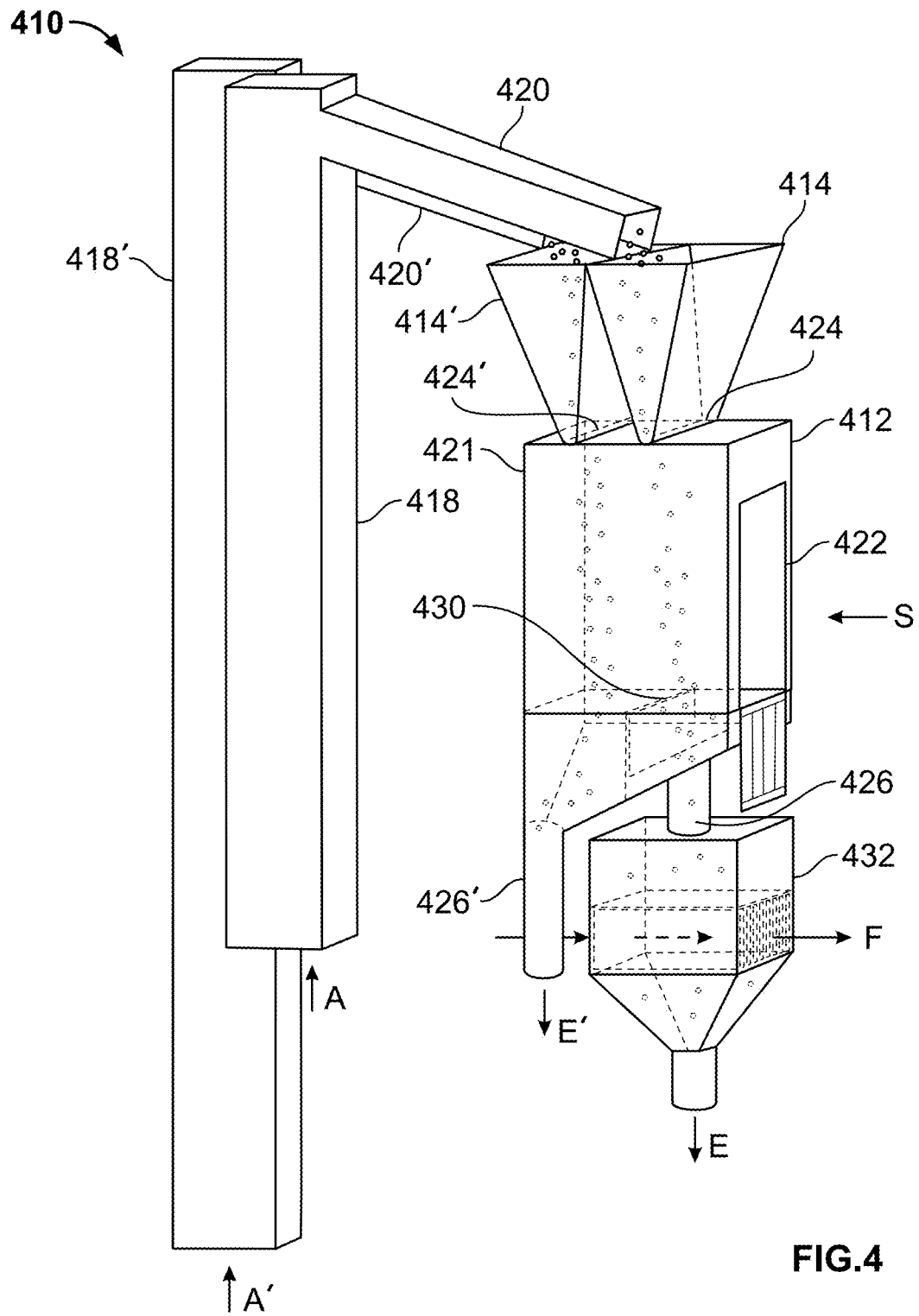
FIG. 4 illustrates another receiver system according to an embodiment of the disclosure.

FIG. 4 illustrates another falling particle solar receiver system (receiver system) 410 according to another embodiment of the disclosure. As can be seen in FIG. 4, the receiver system 410 includes a falling particle receiver (receiver) 412, a first or front feed hopper 414, a second or rear feed hopper 414', a first or front feed system 416, a second or rear feed system 416', a front particle feed system (front feed system) 416 and a rear particle feed system (rear feed system) 416'. The front and rear feed systems 416, 416' include a front particle conveyor 418 and front particle feed tube 420 and a rear particle conveyer 418' and a rear particle feed tube 420', respectively. The feed tubes 420, 420' feed particles from the particle conveyors 418, 418' to front and rear feed hoppers 418, 418', respectively. The front and rear particle conveyors 418, 418' receive particles from particle sources A, A', respectively. In this exemplary embodiment, the particle conveyors 418, 418' are particle elevators. However, in other embodiments, other feed conveyor systems, such as, but not limited to screw conveyors, bucket elevators, pocket elevators or paddle lifts, may be used. In operation, either or both of the particle conveyors 418, 418' can be used to form one or both falling particle curtains depending on the particle temperatures that are required and the applications that are required for the particles (e.g., power production vs. process heating).

The receiver 412 includes a receiver body 421 having a window 422 for receiving concentrated solar energy. In this exemplary embodiment, the window 422 is an open space. In other embodiments, the window 422 may be a high temperature material transparent to solar radiation, such as, but not limited to high temperature quartz. The receiver 412 also includes a first or front particle inlet (front inlet) 424 and a second or rear particle inlet (rear inlet) 424' for receiving particles from the front and rear feed systems 416, 416', respectively. The receiver also includes a first or front particle outlet 26 and a second or rear particle outlet 26'. The front and rear inlets 424, 424' are openings into the receiver 412 for distributing particles into two curtains of particles that fall through the receiver 412. In this exemplary embodiment, the front inlet 424 has a triangle waveform and the rear inlet 424' has a linear waveform. The front and rear outlets 426, 426' allow particle discharge steams E, E' to flow out of the receiver 412. As can be seen in FIG. 4, the falling particles are separated by a divider 430 that keeps the particle curtains separate. The discharge particle flows E, E' may be recirculated back to the particle sources A, A' to be fed back into the receiver system 10 or may be used for other heating applications (e.g., desalination, drying, water heating).

In another embodiment, the divider 430 may be removed, the front outlet 426 removed, and the particles combined and discharged through the rear outlet 426'. In this exemplary embodiment, the receiver system 410 is shown with two particle flows or curtains. In other embodiments, the receiver system 410 may include one or more particle feed systems, hoppers, receivers, inlets and outlets for forming one or more falling particle curtains. In other embodiments, the inlets 424, 424' may each have one or more inlets to form one or more curtains of any combination of inlet cross-sections.

In this exemplary embodiment, the receiver system 410 also includes a heat exchanger 432 fluidly connected to the front outlet 426. The heat exchanger 432 receives heated particles from the outlet 426, and transfers heat to a fluid stream F. The heat exchanger 432 can operate or function in the manner as described in other embodiment of this disclosure. In other embodiments, the receiver system 410 may include one or more heat exchangers receiving heated particles from the second outlet 426' instead of or in addition to the heat exchanger 432.

Figure 5:
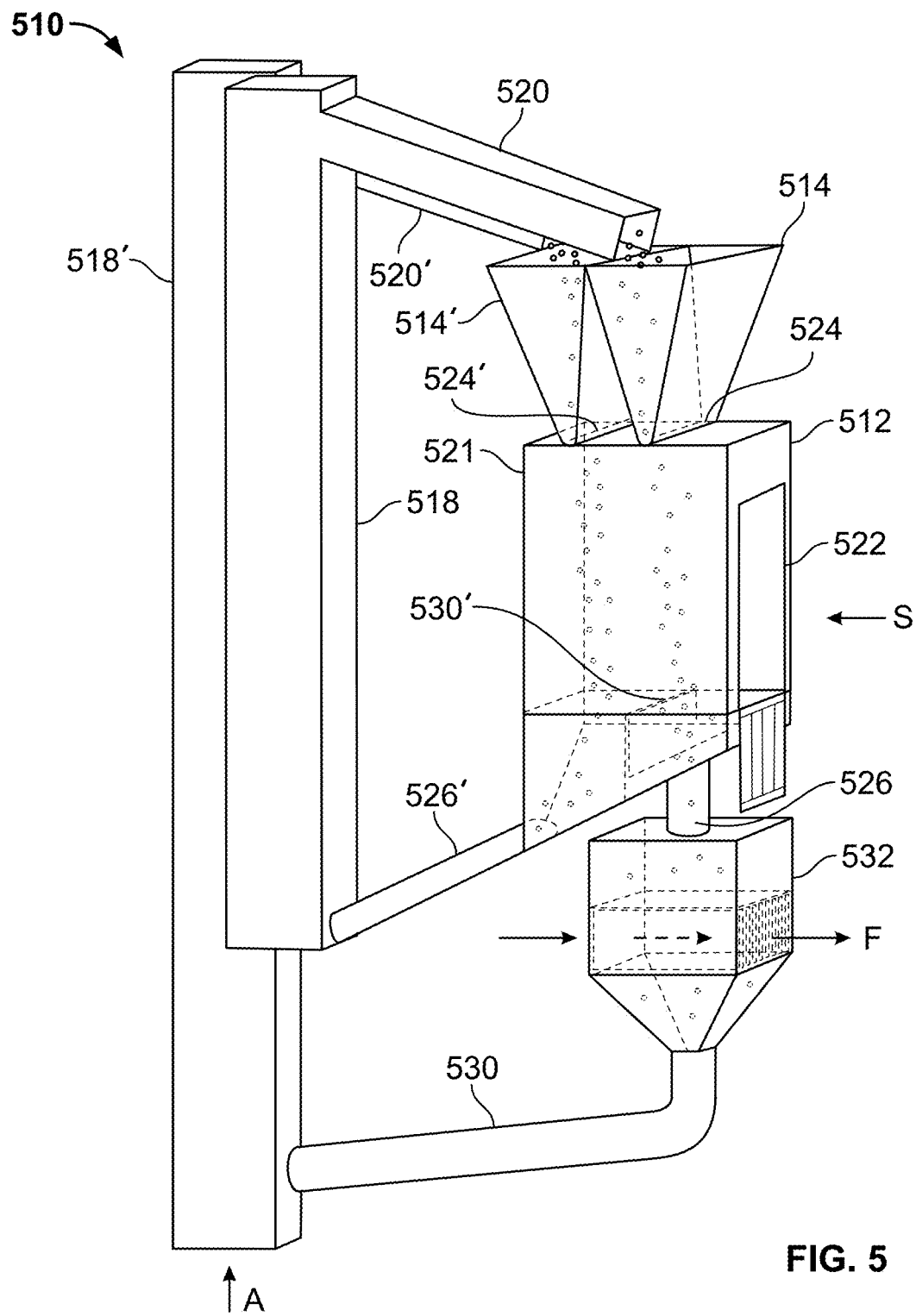
FIG. 5 illustrates another receiver system according to an embodiment of the disclosure.

FIG. 5 is an illustration of another receiver system 510 according to an embodiment of the disclosure. As can be seen in FIG. 5, the receiver system 510 includes a falling particle receiver (receiver) 512, a first or front feed hopper 514, a second or rear feed hopper 514', a first or front feed system 516, a second or rear feed system 516', a front particle feed system (front feed system) 516 and a rear particle feed system (rear feed system) 516'. The front and rear feed systems 516, 516' include a front particle conveyor 518 and front particle feed tube 520 and a rear particle conveyer 518' and a rear particle feed tube 520', respectively.

The feed tubes 520, 520' feed particles provided from the particle conveyors 518, 518' to front and rear feed hoppers 518, 518', respectively. In this exemplary embodiment, the particle conveyors 518, 518' are particle elevators, however, in other embodiments, other feed conveyor systems as described in this disclosure may be used.

The receiver 512 includes a receiver body 521 having a window 522 for receiving concentrated solar energy. In this exemplary embodiment, the window 522 is an open space. In other embodiments, the window 522 may be a high temperature material transparent to solar radiation, such as, but not limited to high temperature quartz. The receiver 512 also includes a first or front particle inlet (front inlet) 524 and a second or rear particle inlet (rear inlet) 524' for receiving particles from the front and rear feed systems 516, 516', respectively. The front and rear inlets 524, 524' are openings into the receiver 512 for distributing particles into two curtains of particles that fall through the receiver 512. The front inlets 524, 524' may have any of the inlet cross-sections as described above, resulting in corresponding particle curtain cross-sections. The receiver also includes a first or front particle outlet 526 and a second or rear particle outlet 526' that allow the front and rear particle curtains to flow out of the receiver 512.

In this exemplary embodiment, the receiver system 510 also includes a heat exchanger 532 fluidly connected to the front outlet 526. The heat exchanger 532 can operate or function in the manner as described in other embodiment of this disclosure. In other embodiments, the receiver system may include one or more additional heat exchangers receiving heated particles from the second outlet 526'. In other embodiments, the receiver system 510 may include one or more heat exchangers receiving heated particles from the second outlet 426' instead of or in addition to the heat exchanger 432.

Particles cooled in the heat exchanger 532 are discharged from the heat exchanger 532 into an extension of the front outlet 530 that feeds the cooled particles to the rear conveyor 516'. Additionally, the rear outlet 526' feeds heated particles to the front conveyor 516. In such a manner, the receiver 512 preheats the rear curtain of falling particles, and feeds those particles to the front conveyor 518 to be further heated in the receiver 512. Those heated particles are then used to heat the fluid stream F.

In an embodiment, the particles initially drop along the back curtain at initial temperatures ~100° C. or higher, depending on heat exchanger outlet temperature) and then will recirculate to the front curtain for a final heating drop to 700° C. or higher, depending on the initial temperature. The rear conveyors 518', which may be bucket elevators, Olds elevators, or insulated mine hoists, lift the cold particles from the extension of front outlet or heat exchanger outlet 530 to the rear inlet 524'. The front conveyor 518 may be a higher-temperature OLDS-type elevator with a rotating steel casing about a stationary screw that will lift the hot particles after the first recirculation drop up to the front inlet 524. In another embodiment, the sequence of particle drops is reversed such that the initial particle drop is in the front 524 and the successive particle drop is in the back 524' with the particle heat exchanger 532 now connected to 526' instead of 526. The advantage of the latter embodiment is that the hottest particles are located in the interior of the cavity and are insulated by the particle curtain(s) in front nearest the aperture.

In this exemplary embodiment, the receiver system 510 is shown with two particle flows or curtains. In other embodiments, the receiver system 510 may include two or more particle feed systems, hoppers, receivers, inlets for forming one or more falling particle curtains, and outlets for feeding the two or more particle outlets to particle conveyors for recirculation.

Figure 6:
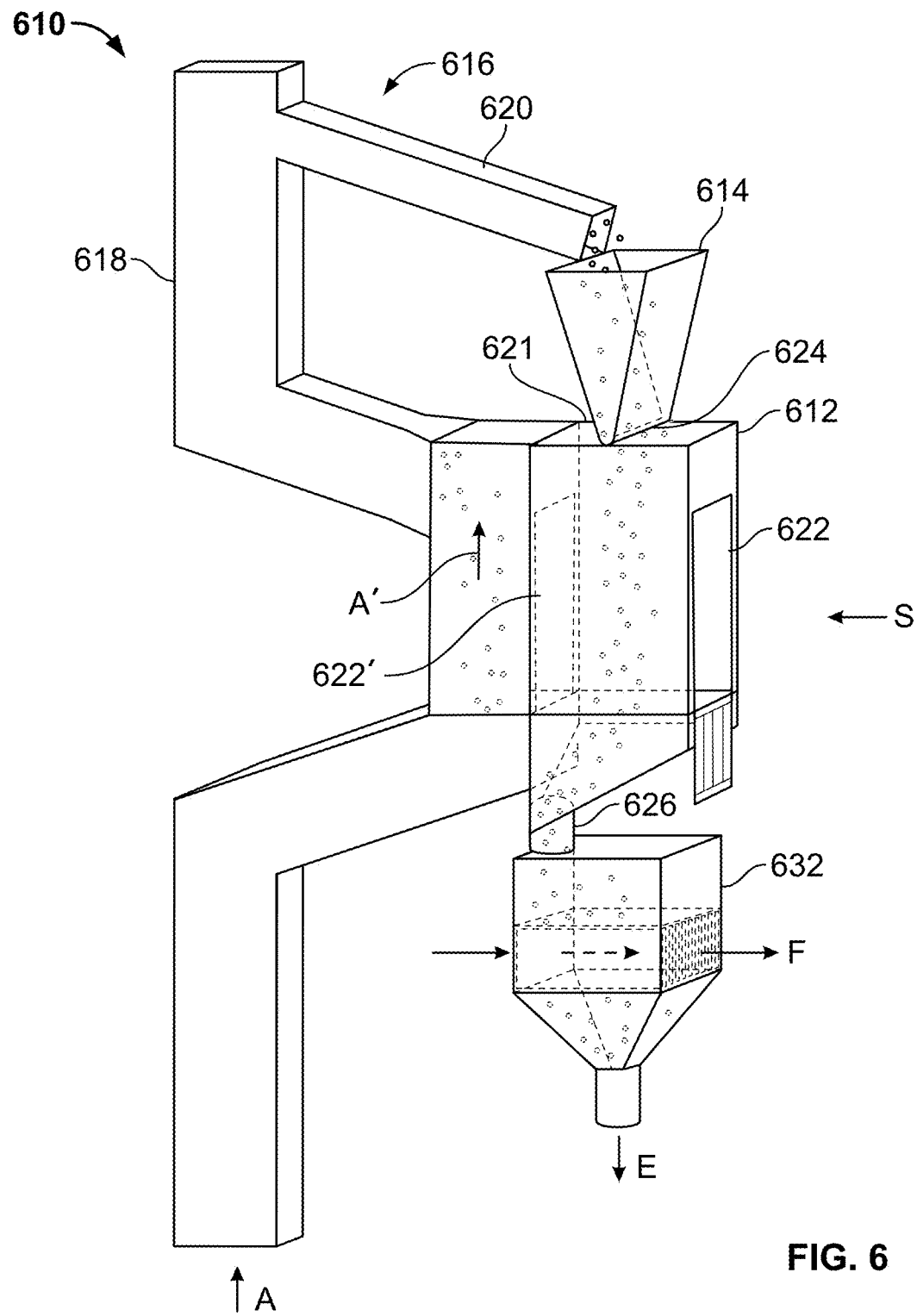
FIG. 6 is an illustration of another receiver system according to an embodiment of the disclosure.

FIG. 6 is an illustration of another receiver system 610 according to an embodiment of the disclosure. As can be seen in FIG. 6, the receiver system 610 included a falling particle receiver (receiver) 612, a feed hopper 614, and a feed system 616. The feed system 616 includes a particle conveyor 618 and a feed tube 620. The feed tube 620 feeds particles from the particle conveyor 618 to the feed hopper 618. The particle conveyor 618 receives particles from a particle source A. In this exemplary embodiment, the particle conveyor 618 is a particle elevator. However, in other embodiments, other feed conveyor systems, such as those described in this disclosure may be used.

The receiver 612 includes a receiver body 621 having a window 622 for receiving concentrated solar energy. In this exemplary embodiment, the window 622 is an open space. In other embodiments, the window 622 may be a high temperature material transparent to solar radiation, such as, but not limited to high temperature quartz. The receiver 612 also includes a particle inlet (inlet) 624 and a particle outlet (outlet) 626. The inlet 624 is an opening into the receiver 612 for distributing particles that fall through the receiver 612. The outlet 626 allows particle flow E to flow out of the receiver 612. The discharge particle flow E may be recirculated back to the particle source A to be fed back into the receiver system 610. The inlet 624 may have any of the cross-sections as described above, forming particle curtains of corresponding cross-sections.

In this exemplary embodiment, the receiver system 610 also includes a heat exchanger 632. The heat exchanger 632 receives heated particles from the outlet 26, and transfers heat to a fluid stream F. The heat exchanger 632 can operate or function in the manner as described in other embodiment of this disclosure.

As can be seen in FIG. 6, the conveyor 618 is in contact with the receiver 612 so that particles being transported through the conveyor 618 may be preheated before being provided to the receiver 612. In this exemplary embodiment, the conveyor 618 and receiver 612 share a common window 722' that allows solar irradiance S to heat the particles traveling through the conveyor 618 in direction A'. In another embodiment, the particles may be heated by conductance and/or irradiance from the receiver 612. In another embodiment, the conveyor 618 and receiver 612 may not be in direct contact, but heat transfer between the components may be facilitated by conductive structures and/or other heat transference systems between the components. In such a manner, a portion of the conveyor 618 will be heated by the hot air and/or concentrated sunlight to preheat the particles on their way up to the top of the receiver 612. This will enable higher-efficiency power cycles (e.g., supercritical steam or supercritical $CO_2$) that can achieve greater and cheaper storage costs with high-temperature, cheap, sand-like particle materials (sintered bauxite or proppants). As appreciated by one of ordinary skill, the preheating of particles before being transported to a receiver may include heating particles in one conveyor, as shown here, or heating particles of multiple conveyors to one or more inlets to the receiver.

The invention being thus described, it will be obvious that the same may be varied in many ways. Such variations are not to be regarded as a departure from the spirit and scope of the invention, and all such modifications as would be obvious to one skilled in the art are intended to be included within the scope of the appended claims. It is intended that the scope of the invention be defined by the claims appended hereto. The entire disclosures of all references, applications, patents and publications cited above are hereby incorporated by reference.

In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A falling particle solar receiver, comprising:
   a receiver body comprising two or more inlets for forming two or more parallel corresponding falling particle curtains of falling particles through the falling particle solar receiver;
   wherein the falling particle curtains are separated by a curtain separation distance.

2. The falling particle solar receiver of claim 1, wherein the two or more inlets comprise two or more inlets having rectangular cross-sections.

3. The falling particle solar receiver of claim 1, wherein the two or more inlets comprise one or more non-liner waveform cross-sections.

4. The falling particle solar receiver system of claim 1, wherein the receiver body further comprises a window for allowing concentrated solar energy to impinge upon the curtain of falling particles and an air flow device for directing a curtain of air across the window.

5. The falling particle solar receiver system of claim 1, further comprising:
   a heat exchanger in fluid connectivity to the receiver body, the heat exchanger receiving heated particles from the receiver body and exchanging heat between the heated particles and a fluid stream.

6. The falling particle solar receiver system of claim 1, further comprising:
   a feed system that feeds particles to the two or more inlets, wherein the feed system pre-heats feed particles with heat from the receiver body.

7. The falling particle solar receiver system of claim 1, wherein the heat from the receiver body is that preheats the feed particles is from direct solar irradiation through the receiver body.

8. The falling particle solar receiver system of claim 1, further comprising:
   a recirculating system for recirculating particles between the two or more inlets.

9. The falling particle solar receiver system of claim 1, wherein the flow of particles into the inlet is controlled by a flow-controlling device to spread the particles across the entire width of the inlet.

10. A method for capturing energy from concentrated solar energy, comprising:
   feeding particles to a solar receiver having two or more inlets for forming two or more corresponding parallel falling particle curtains;
   wherein the falling particle curtains are separated by a curtain separation distance.

11. The method of claim 10, wherein the two or more corresponding parallel curtains comprise two or more parallel linear curtains.

12. The method of claim 10, wherein the two or more corresponding parallel curtains comprise at least one non-linear curtain.

13. The method of claim 10, further comprising:
   recirculating particles from the two or more corresponding parallel falling particle curtains to the two or more inlets.

14. The method of claim 10, further comprising:
   preheating at least one particle feed to the two or more inlets with heat from the solar receiver.

15. The method of claim 10, further comprising:
   heating a secondary fluid with particles from one or more of the falling particle curtains.

16. The method of claim 10, further comprising:
   directing air across a window to the solar receiver.

17. The method of claim 10, further comprising:
   spreading the particles uniformly across a width of the two or more inlets by one or more flow control devices.

* * * * *